United States Patent [19]

Klein et al.

[11]  4,152,224

[45]  May 1, 1979

[54] INORGANIC ADDITIVES FOR ZINC-ALKALINE SECONDARY BATTERIES AND ALKALINE ZINC-PLATING BATHS

[75] Inventors: Yitzchak Klein; Jonathan G. Goldstein, both of Jerusalem, Israel

[73] Assignees: State of Israel, Ministry of Industry, Commerce and Tourism, National Physical Laboratory of Israel; The Scientific Research Foundation, both of Jerusalem, Israel

[21] Appl. No.: 826,764

[22] Filed: Aug. 22, 1977

[30] Foreign Application Priority Data

Aug. 24, 1976 [IL]  Israel ................................. 50348

[51] Int. Cl.$^2$ ..................... C25D 3/22; H01M 10/26
[52] U.S. Cl. ............................. 204/55 R; 252/62.2; 252/182.1; 429/206
[58] Field of Search ............... 429/206; 252/182.1, 252/62.2; 204/55 R, 43 Z, 114, DIG. 2, 123

[56]  References Cited

U.S. PATENT DOCUMENTS 3,816,178   6/1974   Maki et al. ........................ 429/206

Primary Examiner—G. L. Kaplan
Attorney, Agent, or Firm—Fleit & Jacobson

[57]  ABSTRACT

The invention relates to an additive, to be added to conventional electrolytes of alkaline secondary zinc cells or to alkaline zinc plating baths, adapted to establish in said liquids a minimum concentration of $10^{-6}$ M per liter of cobalt ions and a minimum concentration of $5.10^{-6}$ M per liter of cadmium ions, said additive being a coprecipitate of cobalt hydroxide and cadmium hydroxide and either magnesium hydroxide or calcium hydroxide, to electrolytes for alkaline secondary zinc cells and alkaline zinc plating baths containing such additives and to a process for the production of such additives.

15 Claims, No Drawings

INORGANIC ADDITIVES FOR ZINC-ALKALINE SECONDARY BATTERIES AND ALKALINE ZINC-PLATING BATHS

FIELD OF THE INVENTION

The present invention relates to improvements in secondary batteries of the zinc-alkaline type, including Ni-Zn, Ag-Zn, $MnO_2$, $Zn-O_2$ and Zn-air, in which zinc is the negative electrode. This class of batteries shows promise for superior energy and power density characteristics over conventional leadacid storage batteries, but has been limited in development so far due to difficulties associated with recharging the zinc electrode, resulting in limited cycle life at sustained capacity levels for such system.

The invention relates to the incorporation of inorganic additives in zincalkaline secondary batteries of the above type. These additives maintain a good zinc morphology on charge, enhance on cycling the formation of a compact zinc deposit which is adherent to the current collector, and above all, inhibit the formation of dendritic zinc deposits, which can cause catastrophic shorts in zinc-alkaline secondary cells; the additives result in improved cycle life characteristics for such cells.

The invention also relates to the incorporation of these additives into alkaline zinc baths for electroplating. Dense, uniform zinc deposits may be produced, as thin layers or as thick zinc deposits (cladding). Such baths may be operated cyanide-free and at room temperature, with a great reduction in toxicity and control complexity.

STATE OF THE PRIOR ART

A good summary as regards the maintaining of a good zinc morphology and inhibition of dendrite formation during charging/cycling of zinc electrodes in alkaline solution is found in the book "Zinc-Silver Oxide Batteries" by Fleischer and Lander (Published by John Wiley, 1971), Chapters 6 and 7. Conventional methods for achieving these ends include the use of a structured negative (for example Teflonized zinc oxide—the Teflon acts as a matrix for the zinc depositing during charge, this matrix remaining from cycle to cycle); incorporation of a dendrite-resistant separator (for example the use of cellophane-based separators in Ag-Zn systems), or use of non-DC charging modes (pulsed, AC-based signals give improved zinc morphology and adherence).

Fleischer and Lander also refer to the use of battery additives, both organic and inorganic types, contained within the negative or dissolved in the cell electrolyte, as a means of stabilizing electrode morphologies. Concerning organic additives, mention may be made of the non-ionic surfactant emulphogene, which when combined into the zinc electrode does allow cycle lives at medium depths of discharge in excess of 200 cycles for Ag-Zn cells. However, the problem with organic additives, particularly when, like emulphogene, the additive is partially soluble in the alkaline electrolyte, is that the additive on exposure to the strong oxidizing conditions in the vicinity of the positive electrode ultimately will be oxidized and destroyed. Since the amount of additive in the battery is limited, the beneficial effect of the material is soon exhausted, particularly on charged stand or heavy duty cycling.

Inorganic additives, since they should possess less of the drawbacks of irreversible oxidation that organic additives suffer from, might be expected to offer an alternative route to zinc electrode stabilization. Fleischer and Lander report that lead acetate, when present in the electrolyte (typically ambient temperature 30-40 wt % KOH saturated with zincate ion) at concentrations of from 0.5-1 g/l, results in improved zinc deposits as regards adherence and non-dendritic character. This concentration level is equivalent to about $10^{-3}$ M/l of $Pb^{2+}$. Similarly $Sn^{2+}$ ions (introduced as tin chloride or hydroxide), present in concentrations of between $10^{-2}$ to $10^{-4}$ M/l also produce improved zinc plateout characteristics, as reported in British Pat. No. 1,260,959 (Hitachi Maxwell Ltd., 1969).

Armstrong and Bell (Electrochemistry Vol 4, publ. The Chemical Society, 1974) have reviewed the effect of various additives on zinc plating in alkaline solution. They suggest that for $Pb^{2+}$ and $Sn^{2+}$ ions, lead or tin are codeposited with zinc, the co-deposited metal blocking further zinc deposition onto preferred growth sites and leading to additional nucleation. Dendritic tree-like growths are thus inhibited and a more compact deposit results. Unfortunately, few of the workers in this field ever considered the problem or the effect of maintaining such concentrations of beneficial metal ions from cycle to cycle. Metal ions like $Pb^{2+}$ and $Sn^{2+}$, being derived from nobler parent metals than zinc, will co-plate out from solution during charge as a lead-zinc or tin-zinc alloy. Thus, after a few cycles the concentration of beneficial ions in solution will have dropped below the minimum necessary to maintain a good zinc deposit; the $Pb^{2+}$ or $Sn^{2+}$ is lost in the form of trace Pb or Sn deposited on the negative, and there is little likelihood (cf sacrificial corrosion protection) of these ions re-entering the electrolyte again on discharge while any zinc remains in the negative - the usual state of affairs.

One approach to the above problem involves the utilization of sparingly soluble lead or tin compounds normally more complex in nature than the simple salts discussed above, which give rise to a steady state concentration of beneficial ions in the alkaline electrolyte within the optimum range. An example of this approach, in which the $Pb^{2+}$ ion donor is a mixture (calcium hydroxide/inorganic lead compound), incorporated into the zinc oxide negative paste, will be found in British Pat. No. 1,320,611 (Hitachi Ltd., Tokyo Electric Power Co., 1971). The beneficial ion, when depleted by co-plating, will be replenished up to its saturation concentration by dissociation from the solid "storage" phase. The drawback of such schemes, is that the beneficial ion concentration level, particularly if above $10^{-4}$ M/l, is too great for satisfactory cycling of the zinc electrode. The content of co-plated lead or tin in the zinc electrode can rise within 100 cycles or so to several percent. Not only must the quantity of additive needed to replensih the beneficial ion concentration level be excessively high, but a non-negligible foreign metal content of the zinc electrode begins to affect the cell discharge characteristics. Thus, deep discharges of the zinc electrode give rise to a second (or third) discharge plateau as lead or tin commences a partial discharge; this is in itself unsatisfactory, but also the minimum concentration level for the beneficial ion may then be exceeded and the subsequent zinc deposit will have unfavourable morphology. Significant lead or tin content in the zinc electrode will also adversely affect the high power discharge capability of the plate, and may even result in passivation; passivation, of course, precludes useful cell reconditioning techniques to control shape change buildup in zinc-alkaline secondary cells (Haschka et al., Paper 25, Power Sources 5, Publ. Orion Press, 1975). Similar criteria apply against the use of partially soluble indium compounds giving rise to $10^{-3}$ M/l indate ion ($InO_2^-$), the subject of British Patent No. 1,300,959 (Hitachi Maxwell Ltd. 1969), apart from the high cost of indium. A further disadvantage of $Pb^{2+}$, $Sn^{2+}$, $InO_2^-$ beneficial ions, particularly at concentration levels up to $10^{-3}$ M/l, is that on charged stand, considerable self-discharge can take place in the cell by shuttle reactions between positive and negative electrodes.

SUMMARY OF THE INVENTION

According to the present invention there is provided an additive for use in alkaline zinc secondary cells providing a supply of cobalt ions and of cadmium ions, the steady state concentration of these being below $10^{-4}$ M/l, and preferably about $10^{-5}$ M/l at ambient temperature. The source of the above ions is advantageously a gel of co-precipitated hydroxides of cobalt, of cadmium and of magnesium though nickel may be partially substituted for cobalt and calcium may be partially or wholly substituted for magnesium. The molar ratio of cobalt to Cadmium varies between 1:3 to 3:1, the preferred ratio being about 2:1. The molar ratio of the combined concentration of cobalt and cadmium versus magnesium may vary between 10:1 to 1:10, the preferred ratio being about 3:1. The quantity of gel added to the electrolyte can be varied within wide limits, but the practical range is about 0.1 g to 10 g per liter of electrolyte, calculated on a 30 wt % potassium hydroxide saturated with zincate electrolyte. Above a quantity of about 0.1 g/liter the concentration hardly varies, as an equilibrium concentration is attained wherein the concentration of $Cd^{++}$ and of $Co^{++}$ is about $10^{-5}$ M/l (ambient temperature). The concentration of magnesium ions in the solution is negligible, and the magnesium hydroxide serves mainly as carrier, gel stabilizer or extender. The function of nickel and calcium is similar to that of magnesium. At temperatures in the range of about $-40°$ C. to $+40°$ C. the steady state concentration of the above ions changes by a factor of about 2.

The present invention also relates to gels of the above composition, for use as additives to alkaline electrolytes of the battery type defined above and to a process for the production of such gels. The invention also relates to electro-chemical cells and alkaline zinc plating baths with electrolytes of the above type, containing additives according to the above definition. Other and further features of the present invention will become apparent from the following detailed description and examples.

The novel additives may be added directly to the electrolyte. According to yet a further preferred embodiment, means are provided for maintaining a continuous supply and equilibrium concentration of the desired ions in the electrolyte, and especially in the immediate vicinity of the zinc electrodes. The means for maintaining such supply of ions may consist of a suitable support or carrier of such gels. Such gels may also be provided in pervious containers, preferably arranged in close proximity to the zinc electrodes. The hydroxide gels are obtained in the form of a paste, and this may be conveniently supported by a separator or by an independent structure for this purpose.

The novel additives are advantageously prepared by co-precipitation of the mixed hydroxides from a solution containing the respective ions in a predetermined desired molar ratio.

The novel additives result in a considerable improvement of performance of alkaline electrolyte secondary cells having a zinc electrode. A well-adhering substantially dendrite free deposit of zinc is obtained on cycling and the number of cycles which can be obtained without cell failure is substantially increased. Furthermore, the cell performance is maintained at acceptable levels during a substantially increased number of cycles. The effectivity of dendrite-resistant separators is maintained over a considerably increased number of cycles. The invention further provides improved alkaline zinc plating baths. Other and further features of the invention will become apparent from the following detailed description.

The hydroxide gels which serve as additive to the above defined electrolytes are advantageously prepared by co-precipitation. A solution is prepared of water soluble salts of cobalt, cadmium, magnesium, optionally containing nickel and calcium, in a predetermined ratio, and the precipitation is effected by adding a suitable alkali metal hydroxide, preferably potassium hydroxide. The alkali metal hydroxide is added in the form of a solution of from about 1 N to 12 N, until a high pH (about 14) is reached. The precipitation is advantageously effected at a low temperature (about 0° C.). At low temperatures the uniformity of the gel is better. The gel is stabilized by aeration and heating to about 100° C. then the gel is freed from soluble ions and impurities by washing. Suitable water soluble salts are chlorides, sulfates, nitrates, acetates or the like. The water content of the gel can vary within wide limits, from about 10 wt % water for viscous gels, and up to 95 wt % water. The gel may be dried to give a powder of comparatively high surface area, of about 40 to 80 m$^2$/g, determined by the BET method, and such powders may be used as additives. The additive is advantageously introduced into the secondary cell so as to be located in the vicinity of the zinc electrodes. It may be supported by a suitable carrier or support, and such a carrier or support is positioned close to the zinc electrodes. It may be inserted into a suitable pervious envelope or bag which is similarly positioned.

A representative gel according to the present invention has the empirical formula 2 $Co(OH)_2.Cd(OH)_2.Mg(OH)_2.nH_2O$ where n varies between about 10 to 100. It is believed that a small quantity of the cobalt is present in the $Co^{3+}$ state. Part of the cobalt may be replaced by nickel, and part or all of the magnesium may be replaced by calcium by adjusting the composition of the solution of metal salts defined above.

The additive according to the present invention is added to a conventional electrolyte or to an electrolyte which already contains an additive, such as lead, so as to establish a steady state concentration of the desired ions in the required concentration this generally being below $10^{-4}$ M/l electrolyte. Cells with such additive were tested over 500 deep cycles at acceptable capacity levels and the morphology of the zinc electrodes was maintained in good state. The buildup of co-plated cobalt, and cadmium is generally well below 0.05 wt % in the first cycle, and it does not exceed about 0.5 wt % during the subsequent 500 cycles. No nickel, magnesium or calcium were detected in the zinc deposits.

It seems that the cadmium also acts as corrosion inhibitor of zinc electrodes and thus the incorporation of costly mercury additives in the zinc plate may be omitted. The novel additive may be used by itself, or in combination with conventional additives such as mercury compounds, lead and tin-based additives and the like. The additive according to the present invention substantially decreases dendrite formation; a deposit of zinc is obtained having a good morphology and the lifetime and number of cycles which can be effectively utilized is substantially increased. The self-discharge of such cells is substantially reduced and the secondary discharge plateau which is sometimes encountered with conventional cells incorporating lead- and tin-based additives is substantially eliminated.

DESCRIPTION OF THE PREFERRED EMBODIMENT

The following examples illustrate the invention with reference to Ni/Zn cells, Ag/Zn cells, and alkaline non-cyanide zinc-plating baths. It ought to be understood that these are by way of illustration only and that the novel additive can be used with other types of secondary cells having zinc electrodes and with various alkaline zinc-plating baths.

EXAMPLE 1

Preparation of Co-Cd-Mg-Hydroxide Gel

A quantity of 100 ml 2 M cobalt chloride was mixed with 100 ml 1 M cadmium chloride and 100 ml 1 M magnesium chloride were added. The solution was cooled to 0° C. and 12 N aqueous potassium hydroxide was added gradually with vigorous stirring until a pH of about 14 was reached (wide-range pH paper). The reaction mixture was aerated during 1 hour, boiled for 5 minutes, cooled and the gel was filtered off. It was washed with hot water until free of chloride ions and stored in an airtight container. The gel was obtained as a grey viscous substance.

Analysis showed that the molar ratio Co:Cd:Mg was 2:1:1 within ±5% and that about 10% of the cobalt was present as $Co^{3+}$. The water content of the gel was 68 wt % and after drying the surface area of the resulting powder was 70 $m^2/g$ (BET method). The gel was introduced into a 30 wt % KOH electrolyte saturated with zinc oxide and the steady state concentration of Co and Cd ions were respectively $7 \times 10^{-5}$ M/l and $10^{-4}$ M/l at 21° C. and with gel concentrations of above 0.1 g gel per liter electrolyte. A quantity of 2.5 g was used per liter of electrolyte.

EXAMPLE 2

Additive in Alkaline Non-Cyanide Zinc Plating Bath for Zinc-Cladding

Zinc electroplating was carried out at 25° C. with the electrolyte of Example 1 (30 wt % KOH, saturated in zinc-oxide and containing 2.5 g per liter of Co,-Cd-Mg-hydroxide additive gel). The cathode was a low carbon steel substrate (length 15 cm breadth 7 cm, thickness 0.05 mm) placed about 0.5 cm apart from two 100-mesh nickel screens on either side as anode. The solution was stirred, and the plating current was a pulsed current. The bath was easily controlled by adding zinc-oxide to replace zinc which was plated out. After about 16 hr of plating at 1 $A/dm^2$ a uniform and compact adherent, silver-grey deposit of zinc of about 30 g weight had formed on the substrate. The deposit was hard and dense of about 0.5 mm thickness. Analysis showed the steady state concentrations of $Co^{2+}$ and $Cd^{2+}$, in solution to be unchanged at their former values, see Example 1. The Co and Cd content of the zinc deposit were 0.03 and 0.04 atom -% respectively. The weight loss on overnight stand of the zinc plate in the solution containing the additives was less than 0.2%. When zinc electroplating was carried out in an additive-free KOH/zinc-oxide saturated solution, an unsatisfactory dendritic, black, non-adherent deposit began to form after only 1 hour of plating.

EXAMPLE 3

Cycling Tests on Ni-Zn Cells with and without Incorporation of Co, Cd, Mg Hydroxide Additive Gel; effect of the Gel on Cells Containing Pb-Based Additives An additive-free, vented type Ni-Zn cell was constructed from two sintered nickel positives enclosed in microporous polypropylene envelopes each containing a layer of about 5 g of state of the art commercially available zinc dendrite resistant material, and three negatives (Teflonized zinc oxide on a zinc-preplated base plate). The plate dimensions were length 15 cm, breadth 7 cm and thickness 1 mm. The cell capacity, limited by the positives, was 8 Ahr (2 hr rate). The total zinc in the cell was equivalent to 20 Ahr, and the cell was of the limited electrolyte type (40 ml of lithiated 30 wt % KOH). The cell weight and internal volume were respectively 210 g and 120 cc, and since the cell could deliver 8 Ahr at the 2 hr discharge rate at an average voltage of 1.6 V, the observed energy density was 60 Whr/kg. The Ni-Zn cell containing the gel additive was identical in construction to this, except that the state of the art zinc dendrite resistant material in the microporous polypropylene envelopes surrounding the positives was doped uniformly with 0.05 g/envelope of the Co,Cd, Mg hydroxide gel of Example 1 (equivalent to 1% by weight of the dendrite resistant material). Total electrolyte volume was 40 ml and the quantity of gel in equilibrium with electrolyte was equivalent to 2.5 g/l.

The cells were maintained at 25° C. and given a drastic duty cycle–8 hr charge at a constant current of 1.2 A (pulsed current was used) up to a voltage limit of 1.95 V, followed by discharge to 1.3 V at 4 A constant current. After each 25th discharge the cell terminals were shorted for 48 hrs to counter shape change buildup. The effect of cycling on capacity is shown below for the two cells.

| Number of cycles (Reconditioning every 25 cycles) | Capacity of 8 Ahr Ni-Zn cell with gel additive (A hr) | Capacity of 8 Ahr Ni-Zn cell without gel additive (A hr) |
| --- | --- | --- |
| 1 | 7.9 | 8.0 |
| 100 | 7.2 | 7.0 |
| 200 | 6.3 | 5.5 |
| 300 | 5.2 | 3.6 |
| 400 | 4.1 | dendritic shorts: cycle 320 |
| 500 | 3.0 | |

The gel-free cell shows a more rapid fall-off in capacity with cycling compared with the cell containing the gel. The former cell has dropped after 300 cycles to below 50% of initial capacity, and due to the heavy duty cycling mode, the dendrite resistant material in the cell failed 20 cycles later. The cell with the gel additive was still above 50% initial capacity after 400 cycles (by which time deleterious shape change effects were becoming increasingly dominant in the cell), and the dendrite-resistant material was still effective. The zinc electrodes in the gel-free cell developed heavy clusters of zinc on the lower edges and bottom sections much earlier, and to a much greater extent, than in the Ni-Zn cell with gel additive. During the course of the experiments, the cell with gel additive had a lower self-discharge characteristic (1% per day) than the gel-free cell (2% per day). After 530 cycles, the cell was disassembled and the Co and Cd content in the zinc plates was found to be 0.07 and 0.12% respectively.

The effect of the gel additive on a cell containing a Pb-based additive was measured. Two identical gel-free Ni-Zn cells were constructed. In the first, a sealed pellon strip containing 1 g of a conventional Pb-based additive was placed in the electrolyte above the plates. In the second cell the pellon strip contained an equal weight (1.0 g) of Co-Cd=Mg-hydroxide gel in addition to the lead additive. The cells were subjected to a drastic cycling regime (8 hr charge, 2 hr discharge reconditioning every 25 cycles). The cell containing the Pb-additive alone gave over 200 dendrite-free cycles. By this time the capacity had fallen only to 80% of its initial value; however, an unfavourable second discharge plateau (at 1.4 V) was "tailing" the end of discharge characteristic. The cell containing the Pb-additive and gel, retained 80% of its capacity for 300 cycles, and the second discharge plateau showed up only after 350 cycles.

EXAMPLE 4

Preparation of $Co(OH)_2.Ni(OH)_2.Cd(OH)_2.Ca(OH)_2.nH_2O$ Gel, and Cycling Characteristics of an Ag-Zn Cell Incorporating this Gel A mixture of stock solutions was prepared of 1 M/l $CoCl_2$, $NiCl_2$, $CdCl_2$ and $CaCl_2$. 100 ml of each solution were mixed and the mixture was held at 0° C. in an ice bath. A solution of 12 N KOH at 0° C. was added with stirring until a pH 14 was observed with wide-range pH paper. The reaction mixture was aerated (1 hr), followed by boiling (5 min). The resulting gel was filtered off, after cooling, washed with hot water until chloride free, and stored in an airtight jar as a green-grey viscous material.

Analysis showed the molar ratio Co:Ni:Cd:Ca to be 1.0:0.95:1.03:0.98, and that 5% of the Co was present as $Co^{3+}$. The water content in the gel was 60 wt %. When equilibrated at 25° C. with 30 wt % KOH saturated in zincate, the steady state concentration of $Co^{2+}$ and $Cd^{2+}$ in solution were respectively $2 \times 10^{-5}$ and $10^{-5}$ M/l, for gel loadings in the solution above 0.1 g/l, $Ni^{2+}$ and $Ca^{2+}$ were below $10^{-6}$ M/liter.

A cell of the Ag-Zn type, incorporating the above gel additive was constructed using two Teflonized zinc oxide negative electrodes containing 4% mercuric oxide (length 8 cm, breadth 5 cm, thickness 1 mm) and one pasted silver oxide positive (length 8 cm, breadth 5 cm, thickness 0.5 mm). The positive was enclosed in a double envelope of microporous polypropylene containing 3 g of a state of the art zinc dendrite resistant material in uniform layer, to which had been admixed uniformly 0.030 g of the gel material. The cell capacity was limited by the positive to 4 Ahr at the 1 hr rate. The total available zinc in the cell amounted to 6 Ahr. The cell had a limited electrolyte (12 ml of 40 wt % KOH). The cell weight and internal volume were 50 g and 25 ml respectively; since the cell could deliver 4 Ahr at the 1 hr discharge rate at an average voltage of 1.5 V, the observed energy density was 120 Whr/kg.

The cell, maintained at 25° C., was charged at a constant current of 1 A over a 5 hr period to a voltage limit of 1.95 V, and was discharged at 4 A to a final voltage of 1.3 V. After each 25th discharge the cell terminals were shorted together for a 48 hr period in order to offset shape change buildup. The cell achieved 300 dendrite-free cycles by which time the capacity had dropped to 2 Ahr. In the absence of the gel additive in the cell, the capacity had fallen to 2 Ahr after 80 cycles, and due to the severity of the cycling regime, the dendrite resistant separator only held out to 105 cycles.

We claim:

1. An additive, to be added to conventional electrolytes of alkaline secondary zinc cells or to alkaline zinc plating baths adapted to establish in said liquids a minimum concentrate of $10^{-6}$ M per liter of cobalt ions and a minimum concentration of $5.10^{-6}$ M per liter of cadmium ions being a coprecipitated hydroxide gel of cobalt hydroxide and of cadmium hydroxide and with at least one of magnesium hydroxide and calcium hydroxide.

2. An additive according to claim 1, wherein part of the cobalt hydroxide is replaced by nickel hydroxide.

3. An additive according to claim 1 which is a Co-Cd-Mg-hydroxide gel wherein the ratio of Co and Cd to Mg varies from 1:10 to 10:1.

4. An additive according to claim 1, wherein the ratio of Co ions to Cd ions varies from 1:3 to 3:1.

5. An additive according to claim 1, wherein the hydroxide is a Co—Ni—Cd—Mg, a Co—Ni—Cd—Mg—Ca; a Co—Ni—Cd—Ca; a Co—Cd—Mg—Ca; a Co—Cd—Ca or a Co-Ni-Cd coprecipitated hydroxide.

6. A method of inhibiting corrosion of zinc electrodes which comprises adding an effective quantity of an additive according to claim 5 in the vicinity of the said zinc electrode.

7. A process for electroplating with zinc or for cladding with zinc, which consists of electroplating from an electrolyte which contains an additive according to claim 1.

8. An electrolyte for alkaline secondary zinc cells containing 0.1 g or more of an additive according to claim 1 per liter of electrolyte.

9. Alkaline secondary zinc cells containing an electrolyte according to claim 8.

10. An alkaline zinc electroplating bath containing a quantity of 0.1 g or more per liter of an additive according to claim 1 per liter of plating bath.

11. Additives to be added to conventional electrolytes of alkaline secondary zinc cells or to alkaline zinc plating baths, adapted to establish a steady-state minimum concentration of at least $10^{-6}$ M Co-ions and $5.10^{-6}$ M Cd-ions, in combination with Mg or Ca-ions, said additive being a mixture of very sparingly soluble compounds of the required metals in the form of a coprecipitate consisting mainly of hydroxides of the metals in gel form.

12. A process for the production of additives for use in electrolytes of secondary alkaline zinc cells and for use in electroplating baths for electroplating with zinc, which comprises preparing a solution of water-soluble salts of cobalt and cadmium and of magnesium or calcium; precipitating a coprecipitate gel of the hydroxides of same by adding to said solution an aqueous solution of an alkali metal hydroxide until a hydroxide gel precipitate is obtained; separating the precipitate and removing from same soluble impurities by washing with water.

13. A process according to claim 12, wherein the hydroxide gel is aerated and heated after its precipitation.

14. A process according to claim 12, wherein the coprecipitation is effected at a temperature of about 0° C.

15. A process according to claim 12, wherein the hydroxide gel is heated to about 100° C. after aeration.

* * * * *